(12) United States Patent
Patel

(10) Patent No.: US 9,440,618 B2
(45) Date of Patent: Sep. 13, 2016

(54) VEHICLE OPENING MONITORING DEVICE

(71) Applicant: Anilkumar Patel, Pine Mountain, GA (US)

(72) Inventor: Anilkumar Patel, Pine Mountain, GA (US)

( * ) Notice: Subject to any disclaimer, the term of this patent is extended or adjusted under 35 U.S.C. 154(b) by 53 days.

(21) Appl. No.: 14/293,735

(22) Filed: Jun. 2, 2014

(65) Prior Publication Data
US 2015/0343992 A1 Dec. 3, 2015

(51) Int. Cl.
B60R 25/10 (2013.01)
B60R 25/01 (2013.01)

(52) U.S. Cl.
CPC .............. B60R 25/01 (2013.01); B60R 25/10 (2013.01)

(58) Field of Classification Search
CPC ....................................... G08B 13/08
USPC ............ 340/426.24, 426.25, 426.28, 426.29, 340/425.5
See application file for complete search history.

(56) References Cited

U.S. PATENT DOCUMENTS

| 4,897,643 | A | * | 1/1990 | Shibata | H01Q 1/1271 340/5.61 |
| 4,929,925 | A | | 5/1990 | Bodine et al. | |
| 5,113,182 | A | * | 5/1992 | Suman et al. | 340/5.28 |
| 5,330,385 | A | | 7/1994 | Hotta et al. | |
| 5,698,907 | A | * | 12/1997 | Weber | B60J 7/0573 307/10.1 |
| D519,394 | S | | 4/2006 | DiPasquale | |
| 7,068,160 | B2 | * | 6/2006 | Tourneur et al. | 340/471 |
| 7,081,813 | B2 | | 7/2006 | Winick et al. | |
| 8,368,522 | B1 | | 2/2013 | Kralj | |
| 2006/0058936 | A1 | | 3/2006 | Johnston | |
| 2010/0039248 | A1 | | 2/2010 | Mauro | |
| 2012/0078443 | A1 | | 3/2012 | Matsubara | |

FOREIGN PATENT DOCUMENTS

CN 103158671 6/2013

* cited by examiner

Primary Examiner — Toan N Pham

(57) ABSTRACT

A vehicle opening monitoring device for monitors and indicates the presence of unclosed openings of a vehicle when the vehicle is being locked. The device includes a vehicle having a plurality of openings. Each of the openings has a closed position and an open position. A vehicle locking assembly is coupled to the vehicle for locking doors of the vehicle. Each of a plurality of monitors detects when an associated one of the openings is in the closed position. Each monitor is communicatively coupled to a processor operationally coupled to the vehicle locking assembly. The processor allows locking of the vehicle locking assembly when the monitors detect all the openings are in the closed position.

9 Claims, 3 Drawing Sheets

VEHICLE OPENING MONITORING DEVICE

BACKGROUND OF THE DISCLOSURE

Field of the Disclosure

The disclosure relates to vehicle opening monitoring devices and more particularly pertains to a new vehicle opening monitoring device for monitoring and indicating the presence of unclosed openings of a vehicle when the vehicle is being locked.

SUMMARY OF THE DISCLOSURE

An embodiment of the disclosure meets the needs presented above by generally comprising a vehicle having a plurality of openings. Each of the openings has a closed position and an open position. A vehicle locking assembly is coupled to the vehicle for locking doors of the vehicle. Each of a plurality of monitors detects when an associated one of the openings is in the closed position. Each monitor is communicatively coupled to a processor operationally coupled to the vehicle locking assembly. The processor allows locking of the vehicle locking assembly when the monitors detect all the openings are in the closed position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
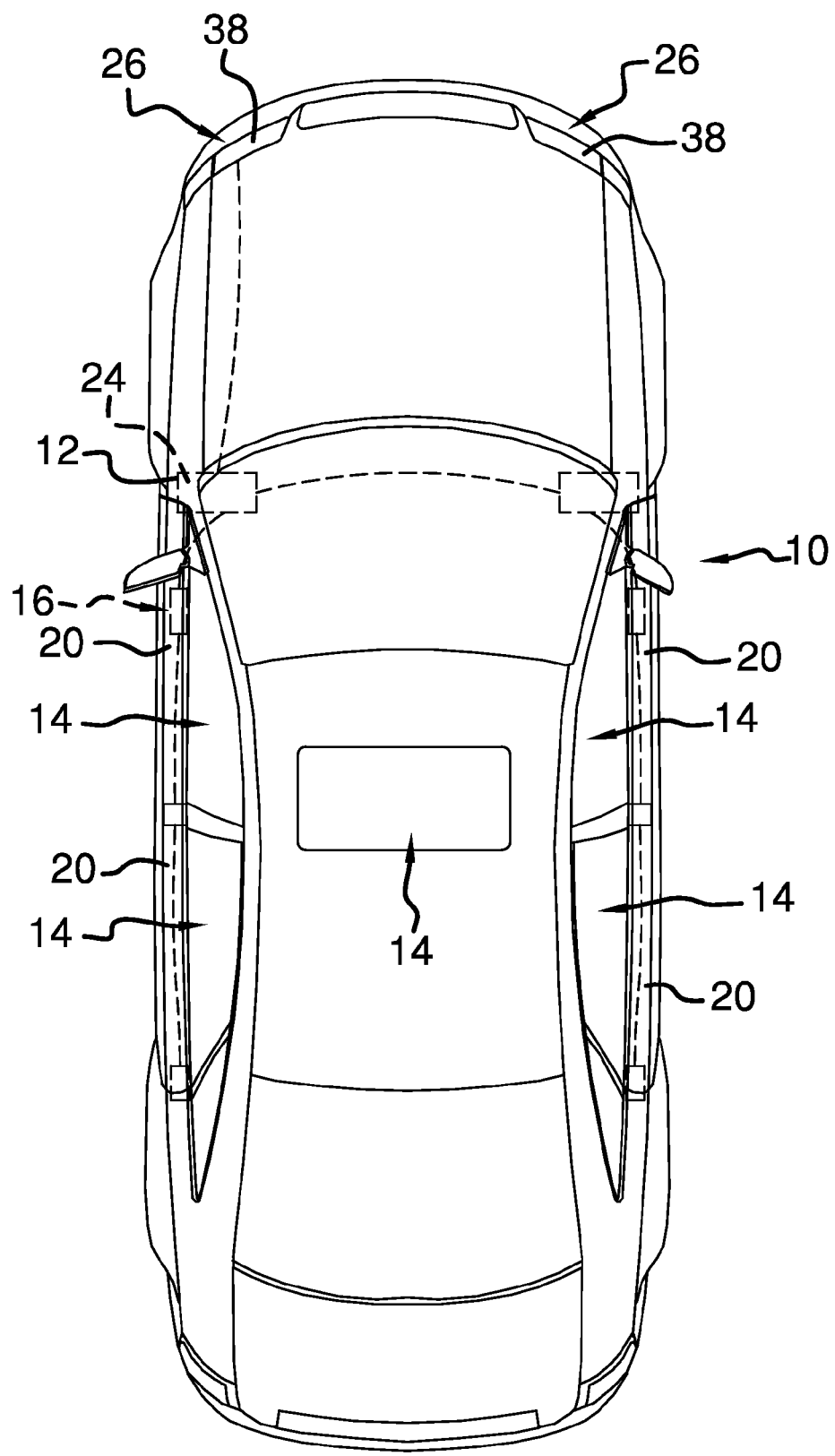
FIG. 1 is a top view of a vehicle opening monitoring device according to an embodiment of the disclosure.
Figure 2:
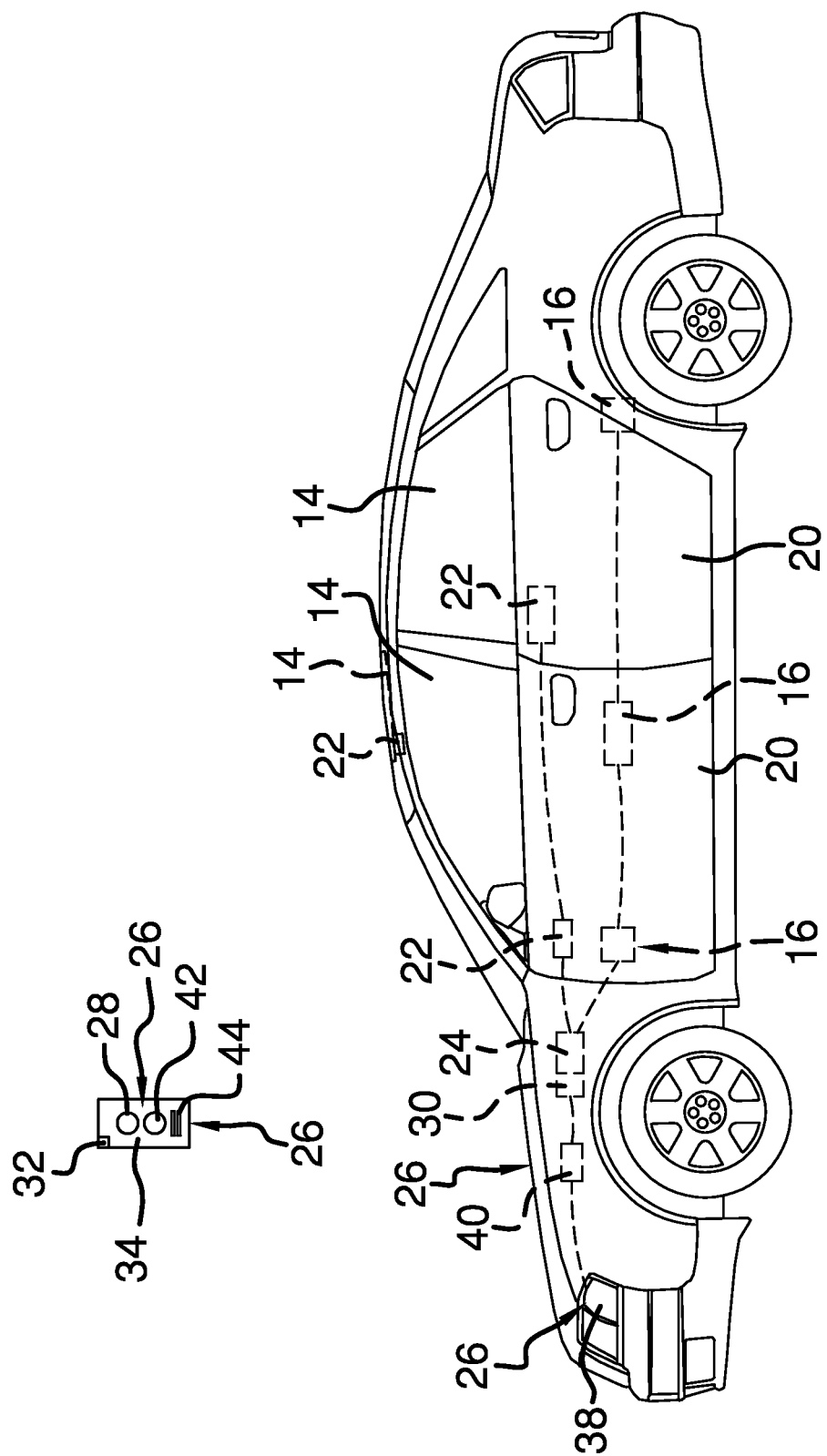
FIG. 2 is a side view of a vehicle opening monitoring device according to an embodiment of the disclosure.
Figure 3:
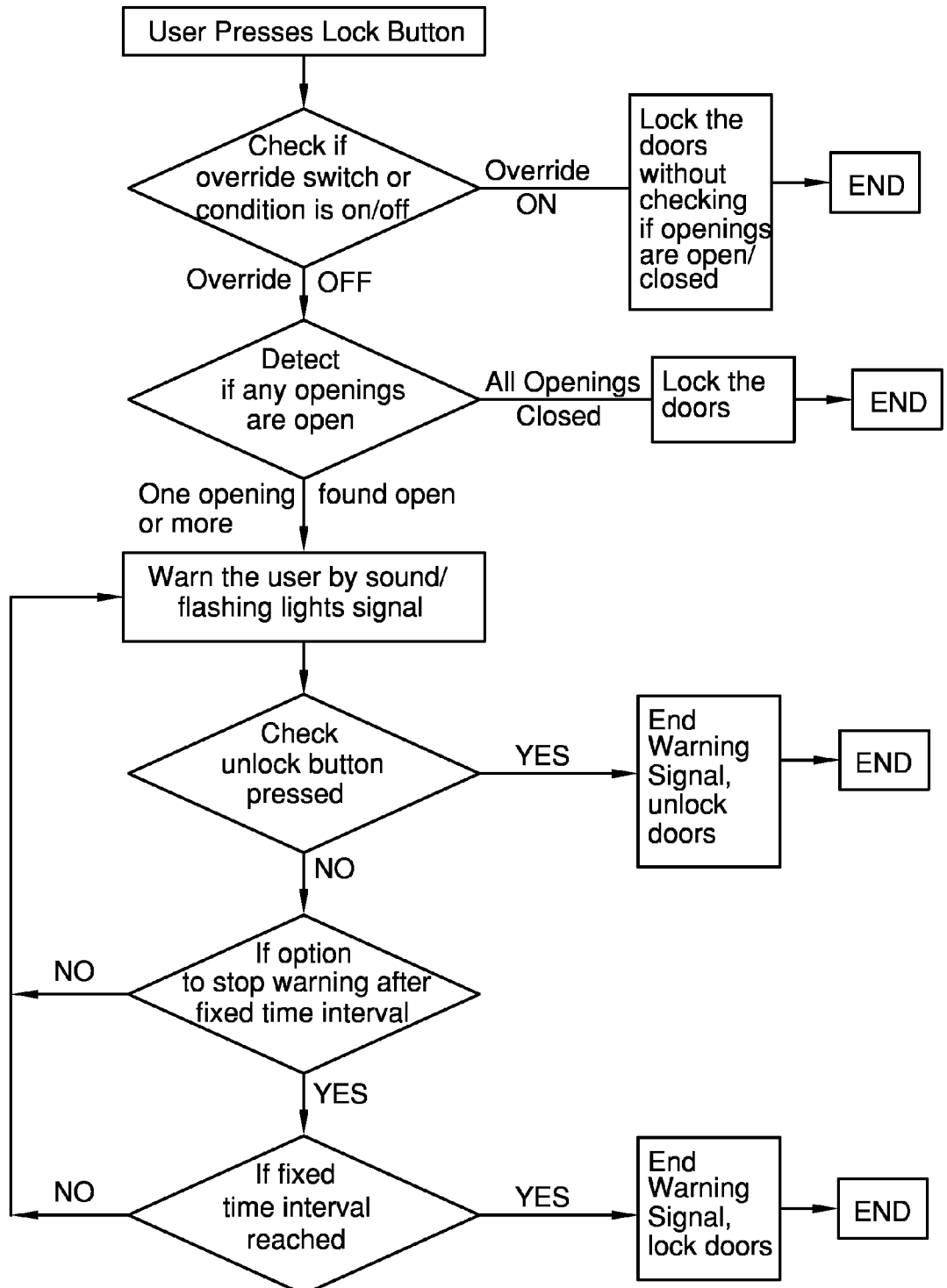
FIG. 3 is a schematic view of a vehicle opening monitoring device according to an embodiment of the disclosure.

With reference now to FIG. 1, a new vehicle opening monitoring device embodying the principles and concepts of an embodiment of the disclosure and generally designated by the reference numeral 10 will be described.

As best illustrated in FIG. 1, the vehicle opening monitoring device 10 generally comprises a vehicle 12 having a plurality of openings 14. The openings 14 comprise windows in a frame, doors, or top of the vehicle 12. Each of the openings 14 has a closed position and an open position. In the open position, precipitation, smoke, or the like would be able to freely enter the vehicle 12. In the closed position, a window or the like would cover or block the opening to prevent environmental communication through the particular opening 14. A vehicle locking assembly 16 of conventional design is coupled to the vehicle 12 for selectively securing doors, tailgates, liftgates or the like, (collectively referred to hereinafter as doors 20) on the vehicle 12. The vehicle locking assembly 16 locks the doors 20 of the vehicle in a conventional manner.

Each of a plurality of monitors 22 is coupled to the vehicle 12. Each monitor 22 detects when an associated one of the openings 14 is in the closed position. Each monitor 22 is communicatively coupled to a processor 24. The processor 24 is operationally coupled to the vehicle locking assembly 16 wherein the vehicle locking assembly 16 is lockable by the processor 24 when the monitors 22 detect all the openings 16 are in the closed position. Conversely, the processor 24 prevents the vehicle locking assembly 16 from locking the doors 20 if one or more of the monitors 22 indicates there is at least one opening 14 in the open position.

An indicator 26 is communicatively coupled to the processor 24. The indicator 26 provides a signal upon the monitors 22 detecting at least one of the openings 14 is in the open position when the vehicle locking assembly 16 is actuated. The indicator 26 may be existing lights 38 or horn 40 on the vehicle 12 or a light 42 or speaker 44 on a remote 34. A deactivation button 28 is operationally coupled to the processor 24. The processor 24 deactivates the indicator 26 upon the deactivation button 28 being manipulated. The processor 24 controls the vehicle locking assembly 16 to unlock the doors 20 upon manipulation of the deactivation button 28.

A timer 30 is communicatively coupled to the processor 24. The timer 30 is actuated with the indicator 26. The indicator 26 is deactivated by the processor 24 upon expiration of a time duration measured by the timer 30. The processor 24 controls the vehicle locking assembly 16 to lock the vehicle doors 20 upon expiration of the time duration. Thus, if the user takes no action after initiation of the indicator 26, the indicator 26 is repeated periodically or remains constant until expiration of the set time duration at which time the doors 20 are locked despite at least one opening 14 being in the open position. The timer 30 may be deactivated by manipulation of the deactivation button 28 wherein the time duration does not expire and the doors 20 are or remain unlocked.

An override switch 32 is electrically coupled between the processor 24 and the vehicle locking assembly 16 wherein the processor 24 is prevented from controlling the vehicle locking assembly 16 when the override switch 32 is activated. When the override switch 32 is activated the processor 24 is bypassed and the vehicle locking assembly 16 works in a conventional manner. The override switch 32 may be implemented in a variety of ways. The override switch 32 may be positioned on the remote 34 or associated with a locking button 36 on the vehicle 12. The override switch 32 may be actuated by performing a specific pattern of actions using existing or conventionally present buttons or a new dedicated button may be provided. The override switch 32 may be permanently actuated or activated for a single event at a time such that a standard condition of the device 10 is not to override.

In use, the override switch 32 is deactivated to engage the device 10. The device prevents immediate locking of the doors 20 of the vehicle 12 when one or more openings 14 are in the open position. The indicator 26 is engaged to signal that one or more openings 14 are in the open position to allow the user to make a conscious decision whether to lock the vehicle 12 while one or more openings 14 remain in the open position.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle opening monitoring device comprising:
   a vehicle having a plurality of openings, said plurality of openings including at least one window of said vehicle, each of said openings having a closed position and an open position;
   a vehicle locking assembly coupled to said vehicle, said vehicle locking assembly locking doors of said vehicle;
   a plurality of monitors, each said monitor being coupled to said vehicle, each said monitor detecting when an associated one of said openings is in said closed position; and
   a processor, each said monitor being communicatively coupled to said processor, said processor being operationally coupled to said vehicle locking assembly wherein said vehicle locking assembly is actuated by said processor such that said doors of said vehicle are locked by actuation of said vehicle locking assembly only when said monitors detect all said openings are in said closed position.

2. The device of claim 1, further comprising an indicator communicatively coupled to said processor, said indicator providing a signal upon said monitors detecting at least one of said openings being in said open position when said vehicle locking assembly is actuated.

3. The device of claim 2, further comprising a deactivation button being operationally coupled to said processor, said processor deactivating said indicator upon said deactivation button being manipulated.

4. The device of claim 3, further comprising a timer, said timer being communicatively coupled to said processor, said timer being actuated with said indicator, said indicator being deactivated by said processor upon expiration of a time duration measured by said timer, said timer being deactivated by manipulation of said deactivation button.

5. The device of claim 3, further comprising said processor controlling said vehicle locking assembly to unlock said vehicle doors upon manipulation of said deactivation button.

6. The device of claim 2, further comprising a timer, said timer being communicatively coupled to said processor, said timer being actuated with said indicator, said indicator being deactivated by said processor upon expiration of a time duration measured by said timer.

7. The device of claim 6, further comprising said processor controlling said vehicle locking assembly to lock said vehicle doors upon expiration of said time duration.

8. The device of claim 1, further comprising an override switch electrically coupled between said processor and said vehicle locking assembly wherein said processor is prevented from controlling said vehicle locking assembly when said override switch is activated.

9. A vehicle opening monitoring device comprising:
   a vehicle having a plurality of openings, said plurality of openings including at least one window of said vehicle, each of said openings having a closed position and an open position;
   a vehicle locking assembly coupled to said vehicle, said vehicle locking assembly locking doors of said vehicle;
   a plurality of monitors, each said monitor being coupled to said vehicle, each said monitor detecting when an associated one of said openings is in said closed position; and
   a processor, each said monitor being communicatively coupled to said processor, said processor being operationally coupled to said vehicle locking assembly wherein said vehicle locking assembly is actuated by said processor such that said doors of said vehicle are locked by actuation of said vehicle locking assembly only when said monitors detect all said openings are in said closed position;
   an indicator communicatively coupled to said processor, said indicator providing a signal upon said monitors detecting at least one of said openings being in said open position when said vehicle locking assembly is actuated;
   a deactivation button being operationally coupled to said processor, said processor deactivating said indicator upon said deactivation button being manipulated, said processor controlling said vehicle locking assembly to unlock said vehicle doors upon manipulation of said deactivation button;
   a timer, said timer being communicatively coupled to said processor, said timer being actuated with said indicator, said indicator being deactivated by said processor upon expiration of a time duration measured by said timer, said processor controlling said vehicle locking assembly to lock said vehicle doors upon expiration of said time duration, said timer being deactivated by manipulation of said deactivation button; and
   an override switch electrically coupled between said processor and said vehicle locking assembly wherein said processor is prevented from controlling said vehicle locking assembly when said override switch is activated.

* * * * *